April 7, 1953     C. GERST     2,633,754
TRANSMISSION

Filed Feb. 18, 1950     7 Sheets-Sheet 2

INVENTOR.
CHRIS GERST
BY
ATT.

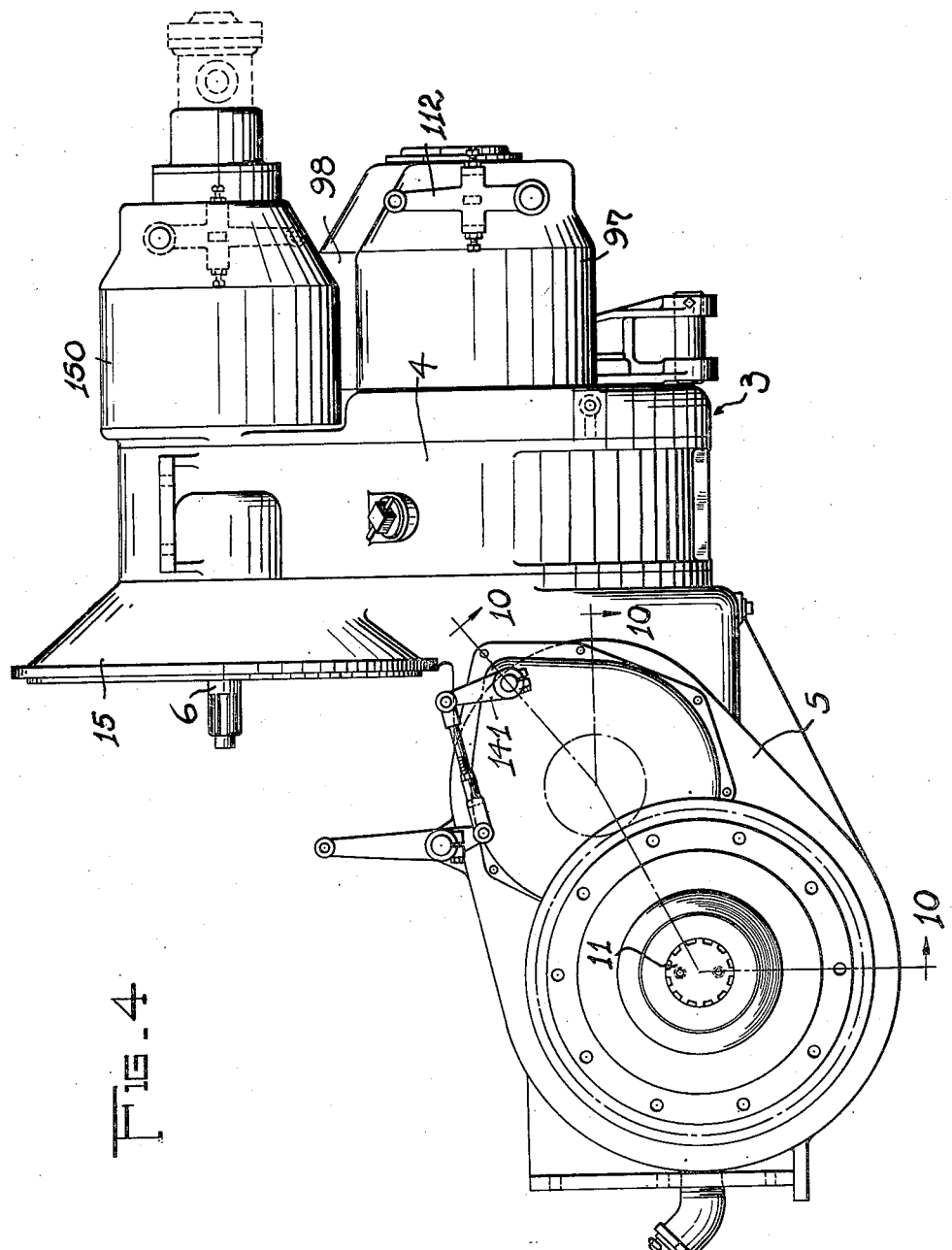

April 7, 1953     C. GERST     2,633,754
TRANSMISSION
Filed Feb. 18, 1950     7 Sheets-Sheet 5
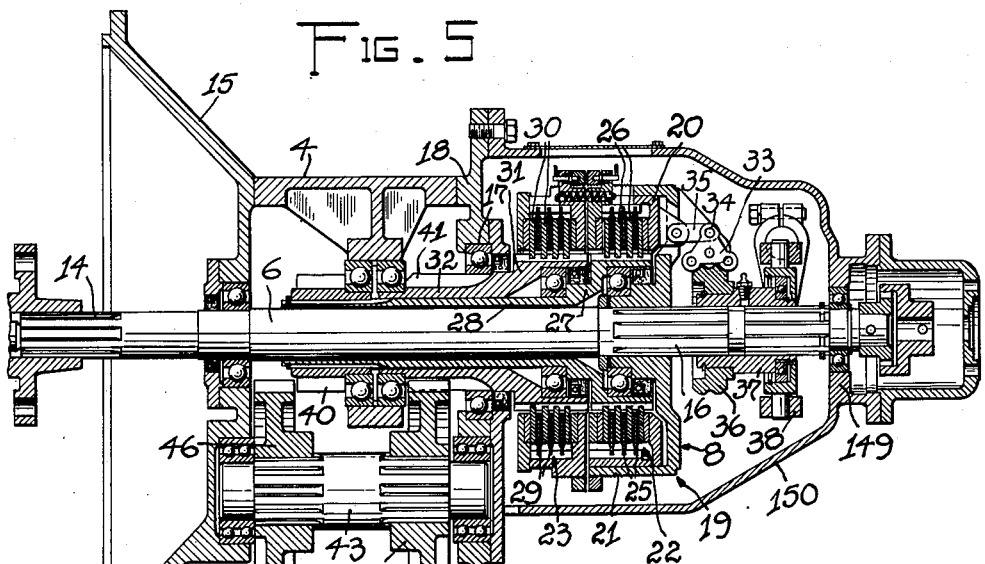
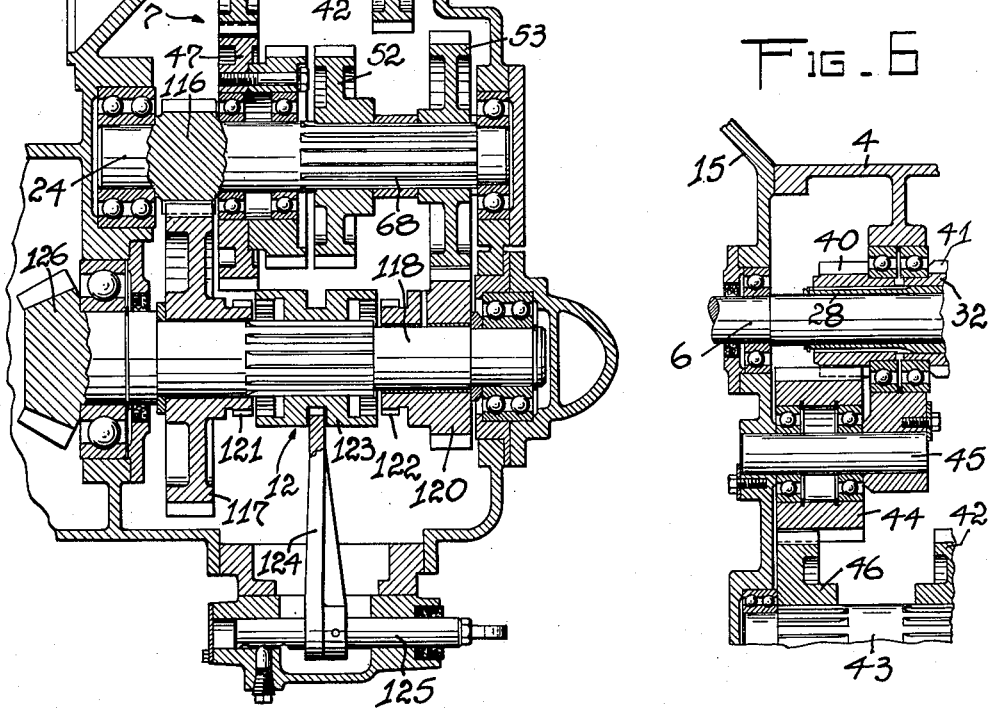
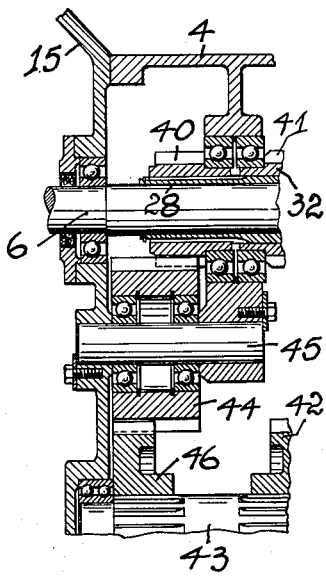
INVENTOR.
CHRIS GERST
BY
ATT.

April 7, 1953  C. GERST  2,633,754
TRANSMISSION
Filed Feb. 18, 1950  7 Sheets-Sheet 6

INVENTOR.
CHRIS GERST
BY
ATT.

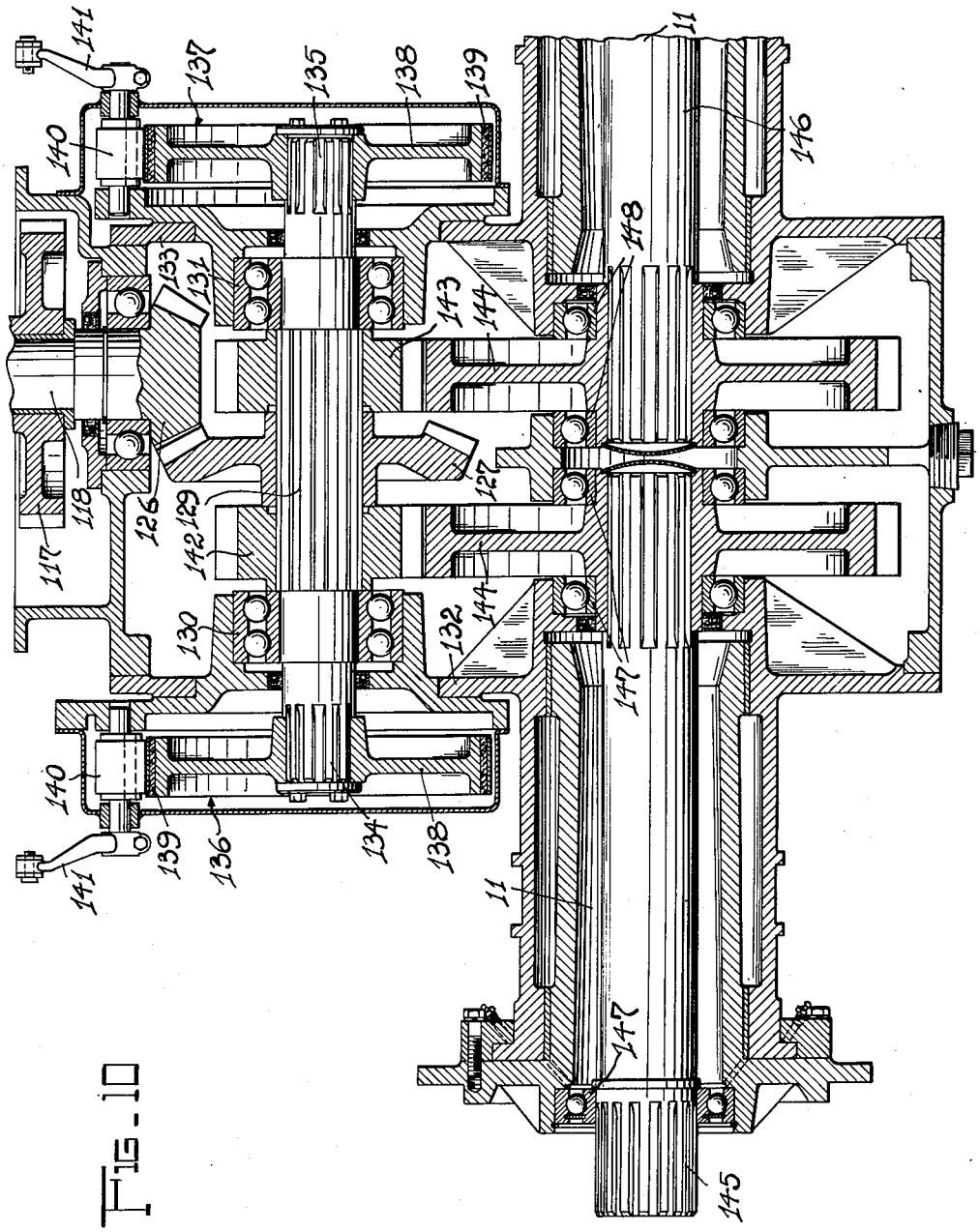

Patented Apr. 7, 1953

2,633,754

UNITED STATES PATENT OFFICE 2,633,754

TRANSMISSION

Chris Gerst, Detroit, Mich., assignor to The Transmission & Gear Company, Dearborn, Mich., a corporation of Michigan Application February 18, 1950, Serial No. 144,979

18 Claims. (Cl. 74—360)

This invention relates to reduction transmission mechanism and is particularly directed to improvements in transmission mechanism for heavy duty road machinery, marine use, etc., although not limited to any particular application.

The primary object of the invention is the provision of a simple, compact, multi-speed transmission mechanism embodying a plurality of associated dual friction clutch means coupled by gearing with the output shaft of the transmission to effect without shifting of gears various speeds of the output shaft.

Another object of the invention is the provision of a simple and economic, reversible reduction transmission mechanism embodying a plurality of associated dual friction clutch means coupled by gearing with the output shaft of the transmission to effect without shifting of gears various forward and reverse speeds of such output shaft.

A further object of the invention is the provision of a multi-speed transmission embodying a plurality of associated dual friction clutch means coupled by gearing with a countershaft to effect without shifting of gears various speeds of said countershaft, and, in addition, including shiftable multiple speed gearing coupling the countershaft with the output shaft of the transmission to effect by shifting of gears in said latter gearing driving of the output shaft at speed ratios which are a multiple of the multiple speeds of the countershaft.

Still another object of the invention is the provision of a multi-speed, reversible reduction transmission embodying a plurality of associated dual friction clutch means coupled by gearing with a countershaft to effect without shifting of gears various forward and reverse speeds of such countershaft, and, in addition, including shiftable multiple speed gearing coupling the countershaft with the output shaft of the transmission to effect by shifting of gears in said latter gearing driving of the output shaft at speed ratios defining a multiple of the multiple speeds of the countershaft.

Still further objects and novel features of construction, combination and relation of parts by which the objects in view have been attained, will appear and are set forth in detail in the course of the following specification. The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 4 is a side view of the transmission;

Fig. 5 is a transversal sectional view through the transmission, the section being taken on line 5—5 of Fig. 3;

Fig. 6 is a fragmentary sectional view, the section being taken on line 6—6 of Fig. 3;

Fig. 10 is a sectional view taken on lines 10—10 of Fig. 4.

Figure 1:
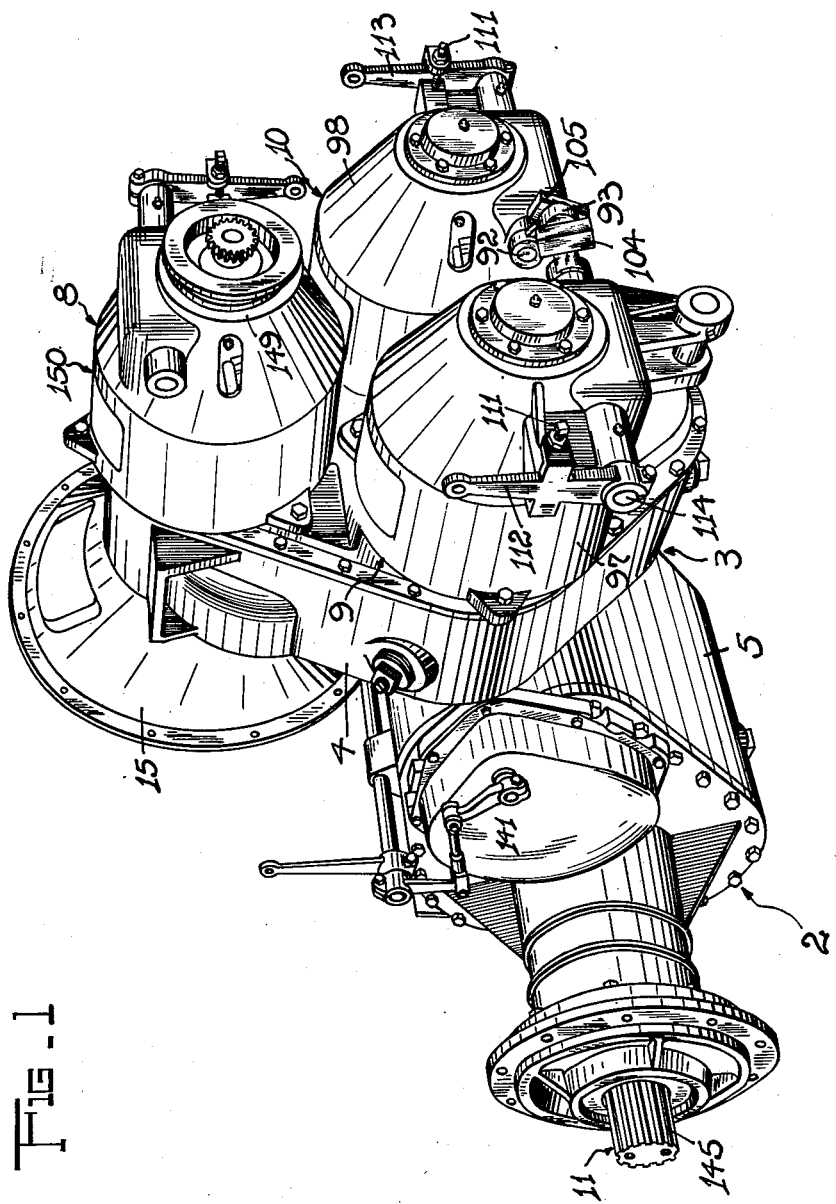
Fig. 1 is a perspective view of a multi-speed transmission embodying the invention.
Figure 2:
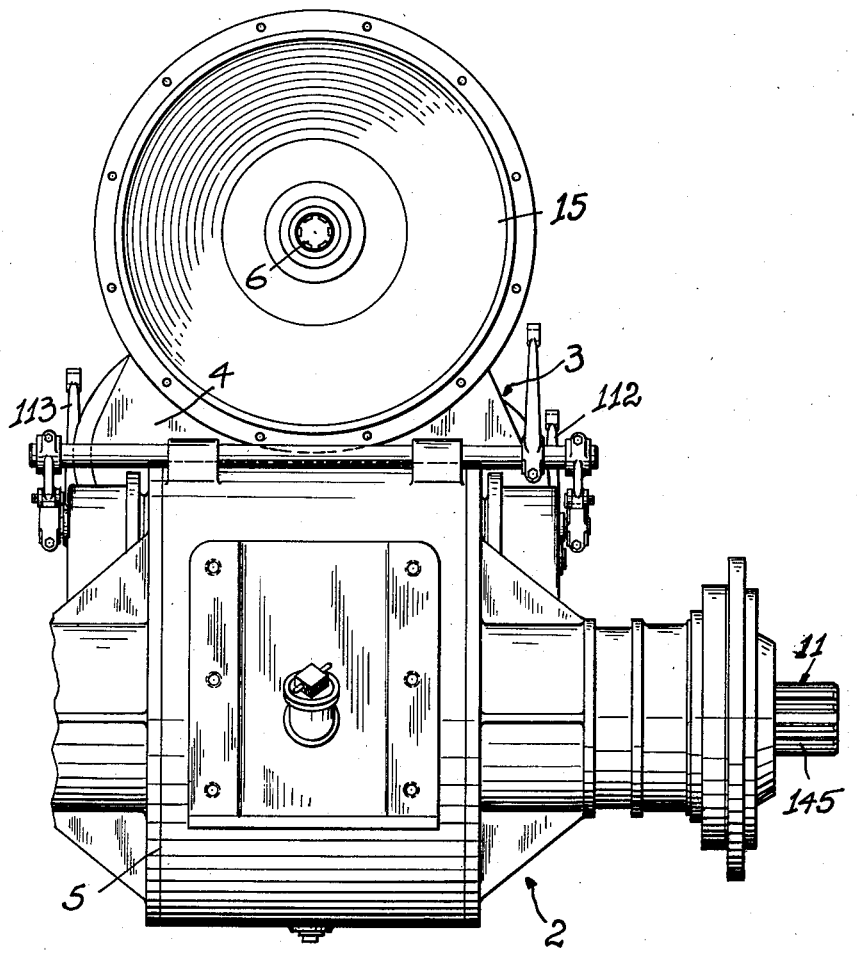
Fig. 2 is a fragmentary front view of the multiple speed transmission shown in Fig. 1.
Figure 3:
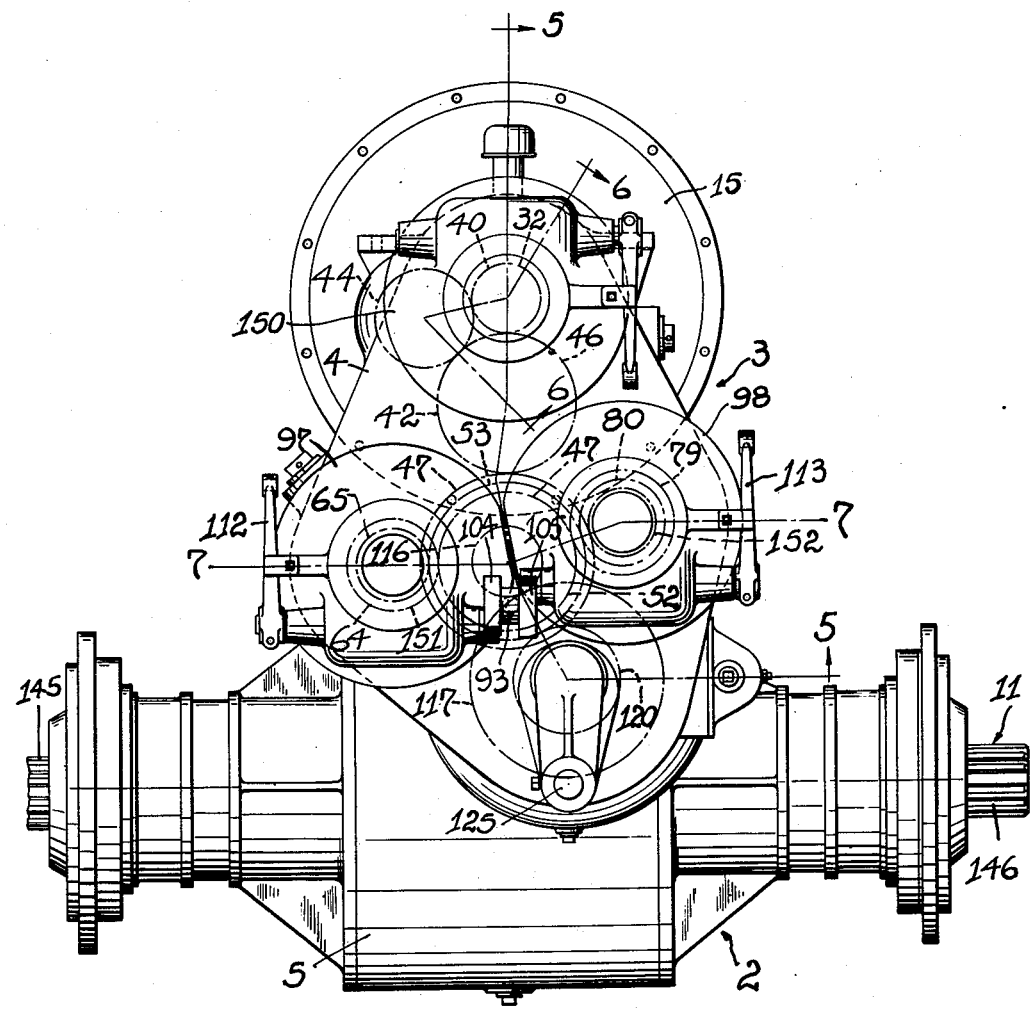
Fig. 3 is a rear view of the transmission.

Referring now more particularly to the exemplified form of the invention shown in the drawings, the multi-speed transmission 2 selected for illustration comprises a housing 3 embodying a primary section 4 and a secondary section 5. The primary section mounts drive shaft 6 and clutch controlled gearing 7 having clutches 8, 9 and 10 arranged outside of this section for ready access in assembly, disassembly and repair procedures. The secondary section 5 mounts a driven or output shaft 11 and shiftable multi-speed gearing 12 arranged to couple clutch controlled gearing 7 with output shaft 11.

In the primary section 4 of housing 3, the drive or input shaft 6 is extended with its front portion 14 outside of said section to and through a bell housing 15. Shaft 6 includes a rear splined portion 16 which is extended outside of section 4 through a flanged opening 17 in the rear wall 18 of section 4 and mounts a dual friction clutch structure 19 of the type described in my pending application Ser. No. 784,681 filed November 7, 1947, now Patent No. 2,573,135, dated October 30, 1951. This dual friction clutch structure which controls forward and reverse rotation of output shaft 11 embodies a pressure plate structure 20 and a backing plate structure 21 slidably and non-rotatably coupled with each other for joint rotation by the input shaft and these pressure plate and backing plate structures are non-rotatably and axially shiftably interengaged with each other to effect by selective engagement of the clutch disks of two individual clutch disk assemblies 22 and 23 coupling of input shaft 6 with a main countershaft 24 to effect rotation of said countershaft in one or the other direction. For such purpose clutch disk assembly 22 embodies friction driving disks 25 coupled with the driving parts of the friction clutch structure and friction driven disks 26 coupled with the enlarged end portion 27 of a driven tubular shaft 28 which is concentrically sleeved upon drive shaft 6 and freely-rotatably mounted with respect thereto; and clutch disk assembly 23 embodies friction driving disks 29 coupled with the driving parts of the friction clutch structure and friction driven disks 30 coupled with the enlarged end portion 31 of a second driven tubular shaft 32 which is concentrically sleeved upon the driven tubular shaft 28 and the drive shaft 6 and freely-rotatably mounted with respect to said two latter shafts.

Actuation of the clutch disk assemblies is effected by dual clutch levers 33, arranged to selectively shift pressure plate structure 20 in opposite directions, which dual clutch levers are pivotally mounted on the driving parts of the clutch structure and include a third lever arm 34 linking dual clutch levers 33 to pressure plate structure 20 by links 35. Dual clutch levers 33 are actuated by a shifting member 36 coupled with a throw-out collar 37 actuated by a fork 38, the shifting member being slidably and non-rotatably mounted on the splined portion 16 of drive shaft 6.

The tubular shafts 28 and 32 are rotating in opposite directions with respect to each other when either one of the clutch disk assemblies 22 and 23 is actuated in the manner previously described, and have their inner end portions extended into the primary housing section 4 and formed with gear teeth 40 and 41, respectively, to provide a forward and reverse driving means for the main countershaft 24. For such purpose the gear teeth 41 of tubular shaft 32, the forward driving means, mesh a gear 42 rigidly mounted on a countershaft 43 and the gear teeth 40 of tubular shaft 28 mesh an idler gear 44 on a shaft 45, which idler gear engages a gear 46 also rigidly mounted on countershaft 43. Gear 46 meshes a double idler gear or clutch driving gear 47 which is freely-rotatably supported on main countershaft 24 and coupled with a plurality of dual friction clutch controlled gear trains 48, 49, 50 and 51 coupled with the main countershaft 24 by gears 52 and 53 mounted on the splined portion 68 of said main countershaft.

The gear trains 48 and 50 jointly embody a rotatably mounted shaft 54 which is extended outside of housing section 4 through a flanged opening 55 in its rear wall 18 and amounts on the extended, splined portion 56 of said shaft a dual friction clutch structure 57 constructed substantially the same as friction clutch structure 19 previously described, therefore, detailed description of structure 57 is thought to be superfluous. Dual friction clutch structure 57 by its clutch disk assemblies 58 and 59 effects selective coupling of shaft 54 with two tubular shafts 60 and 61. These latter shafts are concentrically and freely rotatably sleeved over shaft 54 and each other, have their inner end portions 62 and 63 mounted within the housing section 4, and are formed with gear teeth 64 and 65 meshing the gears 52 and 53 mounted on the splined portion 68 of main countershaft 24, as previously described.

The gear trains 49 and 51 embody a rotatably mounted shaft 69 which is extended outside of housing section 4 through a flanged opening 70 in its rear wall 18 and mounts on the extended, splined portion 71 of said shaft a dual friction clutch structure 72 also constructed substantially the same as friction clutch structure 19 and therefore, not described in detail. Dual friction clutch structure 72 by its clutch disk assemblies 73 and 74 effects selective coupling of shaft 69 with two tubular shafts 75 and 76. These latter shafts are concentrically and freely-rotatably sleeved over shaft 69 and each other, have their inner end portions 77 and 78 mounted within housing section 4 and are formed with gear teeth 79 and 80, respectively, meshing the gears 52 and 53 mounted on the splined end portion 68 of main countershaft 24.

In operation shafts 54 and 69 which mount the dual friction clutch structures 57 and 72 are rotated in the same direction by engagement of double idler gear 47 with gears 151, 152 mounted on shafts 54 and 69, respectively. Rotation of main countershaft 24 is controlled by actuation of the clutch disk assemblies 58, 59 and 73, 74 of the two dual friction clutch structures 57 and 72 which control the gear trains 48, 49, 50 and 51. Clutch disk assemblies 58 and 59 of friction clutch structure 57 are actuated by dual clutch levers 81 linked to the pressure plate structure 82 of this friction clutch structure, which levers are operated by a shifting member 83 coupled with a shifting fork 84 mounted on an elongated rotatably supported shaft 85. Clutch disk assemblies 73 and 74 of friction clutch structure 72 are actuated by dual clutch levers 86 linked to the pressure plate structure 87 of this friction clutch structure, which levers are operated by a shifting member 88 coupled with a shifting fork 89 mounted on an elongated rotatably supported shaft 90. The two shafts 85 and 90 which mount the shifting forks 84 and 89 have their opposed ends 91 and 92 shiftably interlocked by a stationary member 93 in such a manner that either one of these shafts can freely be rotated from neutral position to active position provided both shafts are in neutral position and that shifting of either shaft from neutral to active position automatically locks the other shaft in its neutral position. Such locking action is effected by a yieldable piston member 94 floatingly mounted in a straight bore 95 of stationary member 93 which is secured to the primary section 4 of housing 3 and extended between the housings 97 and 98 of the two dual friction clutch structures 57 and 72. The piston member 94 consists of two axially aligned piston elements 99 and 100 of predetermined combined length, which piston elements are yieldingly spaced from each other by a coil spring 101 seated in recesses 102, 103 of the piston elements. Piston member 94 is held in bore 95 of member 93 by shiftable backing elements 104 and 105 secured to arms 106 and 107 which are attached to the opposed end portions of shafts 85 and 90 to be shifted with respect to member 93 when the shafts 85 or 90 in clutch actuating operations are shifted to different positions.

Backing elements 104 and 105 each include a single recess 108, 109, respectively, dimensioned to fit the rounded portions 110 at the front of the piston elements. These recesses are located to be axially aligned with bore 95 when shafts 85 and 90 are both in neutral position and are shaped to shift the piston elements inwardly when shafts 85 or 90 are shifted from neutral to active position.

Figures 7, 8, 9:
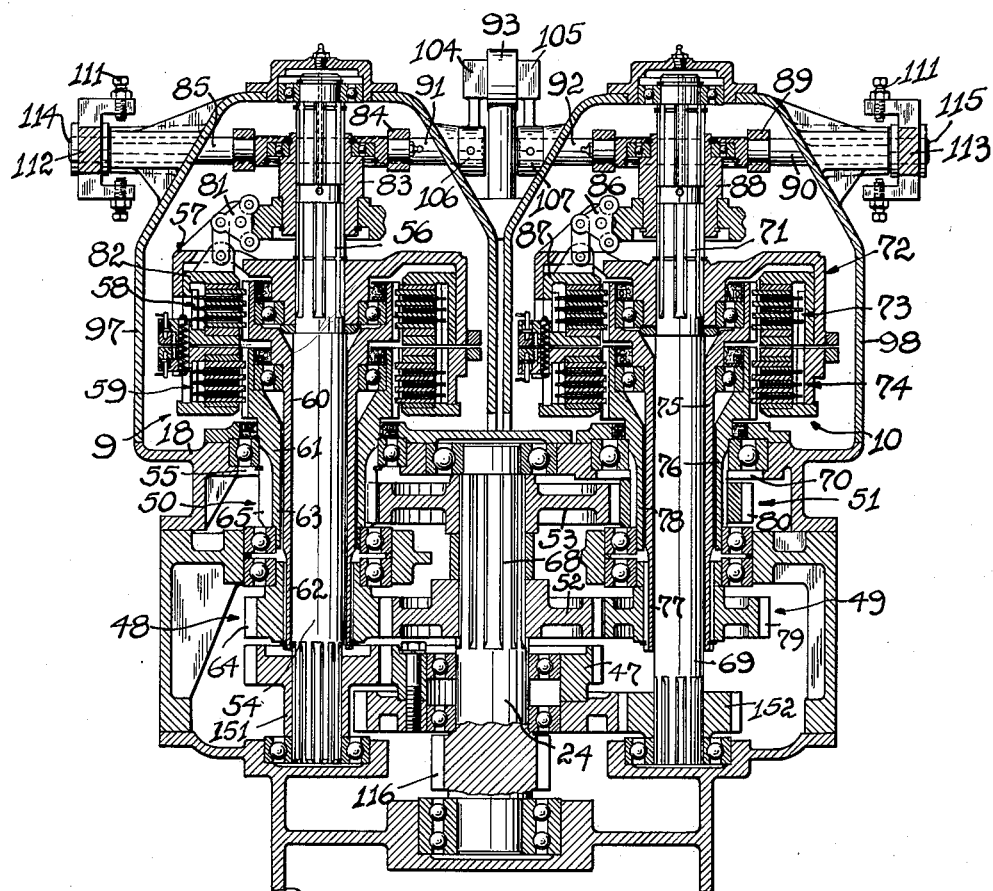
Fig. 7 is a horizontal sectional view, the section being taken on line 7—7 of Fig. 3.
Fig. 8 is a fragmentary sectional view through the structure interlocking the actuating means for two of the dual friction clutch structures.
Fig. 9 is a sectional view on line 9—9 of Fig. 8.

The combined length of piston elements 99 and 100 is substantially equal to the distance between the two backing elements 104 and 105, plus the depth of one of recesses 108 or 109, so that in operation either one of the shafts 85 or 90 is positively locked against rotation when either one of these shafts by the respective backing element has forced the respective piston element out of its recess, as can readily be seen from inspection of Figs. 9 and 10. Rocking movements of shafts 85 and 90 are adjustably limited to predetermined angles by adjusting screws 111 arranged to cooperate with operating levers 112 and 113 attached to the outwardly extended portions 114 and 115 of said shafts.

The main countershaft 24 as previously stated is coupled with output shaft 11 by a shiftable multi-speed gearing 12. For such purpose shaft 24 is formed near its one end with a small gear 116 meshing a large gear 117 freely rotatably mounted on a shaft 118 and has its gear 53, which is splined to said main countershaft, meshing a smaller gear 120 freely-rotatably mounted on shaft 118. The gears 117 and 120 are formed with clutch teeth 121, 122, respectively, and cooperate with a shiftable clutch member 123 which is slidably and non-rotatably mounted on shaft 118 to permit selective direct coupling of said shaft with either one of the gears 117 and 120. Shiftable clutch member 123 is actuated by a shifting fork 124 mounted on a shifting rod 125.

Shaft 118 which by operation of dual friction clutch structures 19, 57 and 72 can be driven with eight different forward and reverse speeds mounts at its outer end a bevel pinion 126 meshing a bevel gear 127 mounted on a splined shaft 129. This shaft which is fulcrumed in section 5 of housing 3 in ball bearings 130, 131 is extended with its opposite ends through the side walls 132 and 133 of said housing section and mounts brake members 136 and 137 on the extended portions 134 and 135 of said shaft, each of which brake members consists of a brake drum or wheel 138 and a brake band 139 adapted to be actuated by brake mechanism 140 of standard design and, therefore, not shown in detail, operated by a lever 141. Shaft 129, furthermore, has splined thereto two equally dimensioned small gears 142 and 143 which mesh equally dimensioned gears 144 on split output shaft 11, the two split shaft members 145, 146 of which are equally dimensioned and mounted in ball bearings 147 and 148, respectively. The split shaft members 145, 146 are symmetrically arranged and extend to opposite sides of housing section 5 so as to permit left-handed and right-handed connection of the output shaft.

In operation the described transmission permits eight forward and eight reverse speeds of the output shaft of which four forward speeds and four reverse speeds are entirely controlled by the three dual friction clutch structures, one of which controls the forward and reverse rotation of the split output shaft and the other two of which control the gear trains effecting the different speeds of the output shaft. These latter two friction clutch structures are driven by the double idler gear or clutch driving gear 47 freely-rotatably mounted on main countershaft 24 which drives shaft 118—the drive shaft for the transmission assembly in section 5 of the housing. Clutch driving gear 47 which is driven by gear 46 includes two steps to drive the clutch structures 57 and 72 at different speeds, clutch structure 72 rotating faster than clutch structure 57, thus providing a simple arrangement permitting substantial variation in the different speeds of the output shaft.

As shown, the drive shaft 6 of the transmission is preferably extended through the rear wall 149 of the housing 150 enclosing the dual friction clutch structure 19 to permit its direct coupling with the shaft of a pump (not shown) or any device to be driven at high speed.

Having thus described my invention, what I claim is:

1. In a multi-speed transmission mechanism, an input shaft, an output shaft, a plurality of gear trains adapted to selectively couple the input shaft with the output shaft, said gear trains including a counter-shaft, an idler gear rotatably mounted on said counter-shaft, clutch-controlled, reversible gearing coupling said input shaft with said idler gear and clutch-controlled multi-speed gearing coupling said output shaft with said counter-shaft, said multi-speed gearing including two spaced dual friction clutch structures mounted on parallel shafts arranged symmetrically with respect to the counter-shaft, and coupled with each other by the idler gear, said dual friction clutch structures including driven shafts continuously geared to each other and said counter-shaft.

2. A multi-speed transmission mechanism as described in claim 1, including an individual controlling device for each one of said two dual friction clutch structures, and a single locking device for said controlling devices adapted to prevent activation of either one of the two dual friction clutch structures when the other one thereof is activated.

3. In a multi-speed transmission mechanism an input shaft, a counter-shaft, a plurality of gear trains adapted to selectively couple said input shaft with said counter-shaft, said gear trains including forward and reverse gearing controlled by a single dual friction clutch structure, multi-speed gearing coupled with said forward and reverse gearing, and two dual friction clutch structures controlling said multi-speed gearing, each of said two dual friction clutch structures including driven shafts arranged parallel to the counter-shaft and geared thereto, driving shafts mounting the friction clutch structures and idler gear means connecting the driving shafts with each other and the forward and reverse gearing, a shifting means for each of said two dual friction clutch structures and locking means coupled with said shifting means adapted to prevent shifting of either one of the two dual friction clutch structures into clutching action when the other one of said two friction clutch structures is activated.

4. A multi-speed transmission as described in claim 3, wherein the shifting means for the two dual friction clutch structures each consists of a shiftable activating means slidably mounted on the respective driving shaft and a lever mounted on a rotatable shaft rectangularly related to said driving shafts, and wherein the locking means for all shifting means includes cooperating elements secured to the respective levers on the respective rotatable shafts.

5. A multi-speed transmission as described in claim 3, wherein said shafts and gear trains are mounted in a housing, wherein said driving shafts are extended outside of said housing and have mounted on their extended portions the said dual friction clutch structures, wherein the respective shifting means for each one of the two dual friction clutch structures includes a shiftable activating means slidably mounted on the respective driving shaft and a shifting lever mounted on a rotatable shaft, arranged at right angle to said driving shafts, and wherein said locking means for all said controlling means includes cooperating elements secured to and shiftable with the said respective levers.

6. In a multi-speed transmission mechanism an input shaft, a counter-shaft, an output shaft, a plurality of gear trains adapted to couple said input shaft with said counter-shaft and said counter-shaft with said output shaft, a plurality of dual friction clutch structures each controlling two of said gear trains, said gear trains including driving shafts arranged symmetrical and parallel to said counter-shaft, said driving shafts mounting said dual friction clutch structures and being geared to each other for rotation in the same direction by means of an idler gear rotatably supported by said counter-shaft, and a clutchable change speed unit coupling said counter-shaft with said output shaft.

7. In a multi-speed transmission mechanism a housing having mounted therein an input shaft, a countershaft, an output shaft, dual friction clutch controlled forward and reverse gearing coupled with said input shaft, a plurality of gear trains coupling said forward and reverse gearing with said counter-shaft, and a plurality of dual friction clutch structures arranged outside of said housing adjacent to one wall thereof, each of said latter dual friction clutch structures controlling coupling of two of said gear trains with said counter-shaft, said latter friction clutch structures mounted on outwardly extended shafts parallelly arranged symmetrical and parallel to said counter-shaft and geared to each other for rotation in the same direction and multi-speed gearing coupling said counter-shaft with said output shaft.

8. A multiple-speed transmission mechanism as described in claim 7, wherein said input shaft is extended through said housing, and wherein said dual friction clutch controlled forward and reverse gearing includes a dual friction clutch structure mounted on the outwardly exposed rear end portion of said input shaft to arrange all dual friction clutch structures of the mechanism outside of said housing adjacent to one wall thereof.

9. A multiple-speed transmission mechanism as described in claim 7, wherein said input shaft is extended through said housing, wherein said dual friction clutch controlled forward and reverse gearing includes a dual friction clutch structure mounted on the outwardly exposed rear end portion of said input shaft to arrange all dual friction clutch structures of the mechanism outside of said housing adjacent to one wall thereof, wherein said multi-speed gearing is arranged in a housing attached to said first housing and wherein said multi-speed gearing is coupled with said output shaft by gearing including bevel gearing to facilitate angular relationship between said input shaft and said output shaft.

10. A multiple-speed transmission mechanism as described in claim 9, wherein said gearing coupling said multi-speed gearing with said output shaft includes a shaft extended at opposite ends outside of the housing, and brake structures coupled with the extended portions of said one shaft and symmetrically arranged with respect thereto.

11. In a multi-speed transmission mechanism a housing, an input shaft, a counter-shaft, and a plurality of gear trains including multi-speed gearing, said shafts and gear trains being mounted in said housing and said multi-speed gearing including a plurality of interengaged dual friction clutch structures arranged outside of said housing, said dual friction clutch structures being mounted on driving shafts extended outside of said housing in symmetrical relation to said counter-shaft, and idler gear means coupled with said input shaft and rotatably mounted on said countershaft, said idler gear means meshing with gearing on said driving shafts to gear same to each other for rotation in the same direction, said dual friction clutch structures adapted to selectively couple the idler gear means with said gear trains for multi-speed drive of said counter-shaft by said input shaft.

12. A multi-speed transmission as described in claim 11, wherein said idler gear means consists of a double gear, the gears of which have different diameters and are coupled with said driving shafts to rotate same at different speeds with respect to each other and effect substantial differences in the speed ratios of said transmission.

13. A multi-speed transmission as described in claim 11 including forward and reverse gearing coupling said input shaft with said idler gear means rotating said driving shafts in the same direction, said idler gear means consisting of a double gear, the gears of which have different diameters and are coupled with said driving shafts to rotate same at different speeds with respect to each other and effect substantial differences in the speed ratios of said transmission.

14. In a multi-speed transmission mechanism, a drive shaft, a counter-shaft, a driven shaft, a plurality of gear trains adapted to couple said drive shaft with said counter-shaft and said counter-shaft with said driven shaft, a plurality of dual friction clutch structures each controlling two of said gear trains, said dual friction clutch structures including driving shafts arranged symmetrically and parallel to said counter-shaft and mounting said dual friction clutch structures, and idler gear means rotatably supported by said counter-shaft, said idler gear means being geared to said drive shaft and to said driving shafts for rotating same in the same direction.

15. A multi-speed transmission as described in claim 14, wherein said dual friction clutch structures are arranged in symmetrical parallel relation to said driven shaft, and wherein the driving shafts of the dual friction clutch structures are continuously geared to each other by an idler gear rotatably mounted on the driven shaft and driven by said drive shaft.

16. A multi-speed transmission as described in claim 14, wherein said dual friction clutch structures are arranged in symmetrical parallel relation to said driven shaft, wherein the driving shafts of the dual friction clutch structures are continuously geared to each other by double idler gear means rotatably mounted on said driven shaft, wherein said idler gear means is driven by said drive shaft, and wherein respective shafts of the dual friction clutch structures include gear means continuously engaged with corresponding gear means on said driven shaft.

17. A multi-speed transmission as described in claim 14, including a dual friction clutch-controlled forward and reverse gearing arranged between the drive shaft and the multi-speed gearing, shifting means for each one of said dual friction clutch structures for actuating same and a single locking means cooperating with all said shifting means in preventing actuation of all other dual friction clutch structures when one dual friction clutch structure is actuated by its shifting means.

18. In a multi-speed transmission a drive shaft, a driven shaft and clutch-controlled gearing transmitting motion from said drive shaft to said driven shaft, said gearing including multi-speed gearing coupled with said drive shaft and friction clutch structures controlling said multi-speed gearing and adapted to selectively couple same at different speed ratios with the driven shaft, said dual friction clutch structures each including a driving shaft mounting the clutch structure and two shafts geared to the driven shaft, the driving shafts of the dual friction clutch structures being arranged symmetrical to the driven shaft, geared to the drive shaft and geared to each other, to be rotated at different speeds in the same direction, and the corresponding shafts of the other shafts of the dual friction clutch structures being arranged symmetrical to the driven shaft and geared to each other to be rotated at the same speed to transmit selective transmission of motion to the driven shaft when either one of the dual friction clutch structures is activated.

CHRIS GERST.

REFERENCES CITED

The following references are of record in the file of this patent:

UNITED STATES PATENTS

| Number | Name | Date |
|---|---|---|
| 905,519 | Hanson | Dec. 1, 1908 |
| 1,081,763 | Meyers | Dec. 16, 1913 |
| 2,100,810 | Livermore | Nov. 30, 1937 |
| 2,304,032 | Schmitter | Dec. 1, 1942 |
| 2,443,313 | Geist | June 15, 1948 |
| 2,536,737 | Gerst | Jan. 2, 1951 |
| 2,553,376 | Le Tourneau | May 15, 1951 |

FOREIGN PATENTS

| Number | Country | Date |
|---|---|---|
| 391,882 | Great Britain | May 4, 1933 |
| 462,365 | Great Britain | Mar. 8, 1937 |
| 529,482 | Great Britain | Nov. 21, 1940 |
| 710,333 | Germany | Sept. 10, 1941 |
| 799,949 | France | June 23, 1936 |